US012761063B2

(12) United States Patent
Hoferer et al.

(10) Patent No.: US 12,761,063 B2
(45) Date of Patent: Oct. 13, 2026

(54) LEVEL-MEASURING DEVICE WITH SELECTABLE QUALITY LEVEL OF A MONITORING FUNCTION

(71) Applicant: VEGA Grieshaber KG, Wolfach (DE)

(72) Inventors: Christian Hoferer, Offenburg (DE); René Herrmann, Oberwolfach (DE); Manuel Kaufmann, Berghaupten (DE); Martin Gaiser, Alpirsbach (DE); Joachim Benz, Hausach (DE)

(73) Assignee: VEGA Grieshaber KG, Wolfach (DE)

( * ) Notice: Subject to any disclaimer, the term of this patent is extended or adjusted under 35 U.S.C. 154(b) by 433 days.

(21) Appl. No.: 18/303,488

(22) Filed: Apr. 19, 2023

(65) Prior Publication Data

US 2023/0332939 A1 Oct. 19, 2023

(30) Foreign Application Priority Data

Apr. 19, 2022 (EP) .................................... 22168889

(51) Int. Cl.
*G01F 23/2962* (2022.01)
*G01F 23/284* (2006.01)
*G01F 23/80* (2022.01)

(52) U.S. Cl.
CPC ........ *G01F 23/2962* (2013.01); *G01F 23/284* (2013.01); *G01F 23/804* (2022.01)

(58) Field of Classification Search
None
See application file for complete search history.

(56) References Cited

U.S. PATENT DOCUMENTS

| | | | |
|---|---|---|---|
| 8,830,118 | B2 | 9/2014 | Wennerberg et al. |
| 9,645,003 | B2 | 5/2017 | Malinovskiy |
| 2008/0302439 | A1 | 12/2008 | Spanke et al. |

(Continued)

FOREIGN PATENT DOCUMENTS

| | | | |
|---|---|---|---|
| CN | 1416522 | A | 5/2003 |
| CN | 101013151 | A | 8/2007 |

(Continued)

OTHER PUBLICATIONS

Combined Chinese Office Action and Search Report issued Jun. 26, 2025, in corresponding Chinese Patent Application No. 202310422234.4 (with English Translation of Category of Cited Documents), 8 pages.

(Continued)

*Primary Examiner* — Mark A Shabman
(74) *Attorney, Agent, or Firm* — Oblon, McClelland, Maier & Neustadt, L.L.P.

(57) ABSTRACT

A level-measuring device, for determining a level of a medium is described, with an evaluation unit, that generates a measuring signal for determining the level based on a digitally converted signal of a reflected signal emitted from the level-measuring device toward the medium, wherein the level is determined based on a characteristic feature of the measuring signal; and that monitors, by way of a monitoring function, the determination of the level based on the characteristic feature and wherein the monitoring function selectively has at least one of a higher quality level and a lower quality level to the determination of the level.

17 Claims, 3 Drawing Sheets

(56) References Cited

U.S. PATENT DOCUMENTS

| | | | | |
|---|---|---|---|---|
| 2011/0163910 | A1* | 7/2011 | Sai | G01S 13/36 342/124 |
| 2012/0174664 | A1 | 7/2012 | Welle et al. | |
| 2013/0213132 | A1 | 8/2013 | Wegemann | |
| 2015/0009063 | A1 | 1/2015 | Korsbo et al. | |
| 2015/0192449 | A1 | 7/2015 | Malinovskiy et al. | |
| 2018/0234748 | A1 | 8/2018 | Haddy et al. | |
| 2019/0033116 | A1* | 1/2019 | Hoferer | G01F 25/20 |
| 2020/0103268 | A1* | 4/2020 | Grießbaum | G01F 23/802 |
| 2020/0333176 | A1 | 10/2020 | Welle et al. | |
| 2022/0065685 | A1 | 3/2022 | Inglund et al. | |
| 2023/0142967 | A1 | 5/2023 | Rauer et al. | |

FOREIGN PATENT DOCUMENTS

| | | | |
|---|---|---|---|
| CN | 102338654 | A | 2/2012 |
| CN | 102401681 | A | 4/2012 |
| CN | 103292865 | A | 9/2013 |
| CN | 203274836 | U | 11/2013 |
| CN | 104406643 | A | 3/2015 |
| CN | 104520682 | A | 4/2015 |
| CN | 106404128 | A | 2/2017 |
| CN | 108008405 | A | 5/2018 |
| CN | 110967088 | A | 4/2020 |
| CN | 111337103 | A | 6/2020 |
| CN | 112739994 | A | 4/2021 |
| CN | 113728213 | A | 11/2021 |
| DE | 10 2014 101 904 | A1 | 8/2015 |
| EP | 21 206 634 | | 11/2021 |
| EP | 4 177 578 | A1 | 5/2023 |
| WO | WO 2005/062000 | A2 | 7/2005 |

OTHER PUBLICATIONS

Extended European Search Report issued on Sep. 28, 2022 in European Application No. 22168889.8, 10 pages.

Office Action dated Dec. 1, 2025, issued in counterpart CN Application No. 202310422234.4, with English Translation. (13 pages).

Office Action dated Apr. 22, 2026, issued in counterpart CN Application No. 202310422234.4, with English Translation. (15 pages).

* cited by examiner

LEVEL-MEASURING DEVICE WITH SELECTABLE QUALITY LEVEL OF A MONITORING FUNCTION

CROSS-REFERENCE TO RELATED APPLICATIONS

This application claims the benefit of the filing date of European Patent Application No. 22 168 889.8 filed on 19 Apr. 2022, the entire content of which is incorporated herein by reference.

FIELD

The disclosure relates to a level-measuring device, a method for start-up of a level-measuring device and a use of the level-measuring device.

BACKGROUND

During a start-up of a level-measuring device, in many cases, a large number of reference measurements are required in order to obtain a high level of safety and/or measurement accuracy after the level-measuring device has been put into operation. In the process industry, there are increasing requirements for level sensors that they not only fulfill a measurement task, but rather that they must also fulfill this measurement task reliably.

SUMMARY

For a level-measuring device, safe fulfillment of the measuring task means that the level-measuring device could either determine the correct level within its accuracy class or report a fault if the level-measuring device does not succeed in determining the level unambiguously. Depending on the application, it must be ensured before safe operation, by means of a start-up, that the level sensor reliably fulfills the measuring task. For this purpose, a plant operator is required to approach different levels under process conditions to ensure safe operation. In particular, the requirement that process conditions must be established proves difficult in practice. For example, during start-up, the temperature of the level sensor is different from when the process has been active for several hours. Also conceivable are, for example, buildup or contamination on an antenna in a radar level-measuring device that continuously changes a measurement signal during operation. In addition, some plant operators prefer to substitute hazardous chemical mixtures with, for example, water during start-up.

Consequently, in practice, a start-up can never exactly represent the sensor application during operation. A conventional level-measuring device reveals a missing safety aspect due to this discrepancy.

According to aspects, a level-measuring device, a method for start-up of a level-measuring device, and a use of a level-measuring device according to the features of the independent claims, is proposed. Advantageous embodiments are the subject of the dependent claims and the following specification.

In the specification, the sequence of method steps is presented in such a way that the method can be easily understood. However, the person skilled in the art will recognize that many of the process steps can also be performed in a different sequence and lead to the same result. In this sense, the sequence of process steps can be changed accordingly and is thus also disclosed.

According to an aspect, a level-measuring device for determining a level of a medium is proposed, including an evaluation unit, which is configured:

- to generate, based on a digitally converted signal of a reflected signal, in particular a reflected portion of a signal emitted by the level-measuring device towards the medium, a measurement signal to determine the level based on a characteristic feature of the measurement signal; and
- to monitor, by means of a monitoring function, the determination of the level based on the characteristic feature, wherein the monitoring function selectively includes and/or applies at least a higher quality level or a lower quality level to the determination of the level.

In this regard, the digitally converted signal can be an electrical signal generated by means of the level-measuring device based on the reflected signal. The reflected signal can be a reflected portion, received by the level-measuring device, of a transmitted (emitted) signal emitted by the level-measuring device towards the medium.

The level-measuring device can include a transmitter unit configured to transmit a signal in the direction of the medium, and a sensor unit configured to receive reflected signals and convert them digitally. Furthermore, the level-measuring device can include an evaluation unit configured to convert received and digitally converted signals into a measurement signal or an echo curve. The evaluation unit is further configured to evaluate the measurement signal to determine a level based on the measurement signal, as specified below. The transmitter unit with the sensor unit and the evaluation unit can in particular be implemented as integrated hardware on the same board or on the same chip.

The level can indicate a distance of the level-measuring device to a surface of the medium, or of a medium, where the medium is for example located in an open or closed vessel.

The measurement signal, also called echo curve, results from a digitally converted signal based on at least a portion of a reflected signal emitted by the level-measuring device in the direction of the medium. To generate the measurement signal (or echo curve) of a measurement, different methods can be used depending on the measurement principle applied, such as using a radar level-measuring device or an ultrasonic level-measuring device or a guided radar level-measuring device.

For example, when measuring with ultrasound, the measurement signal can be sampled by means of a sufficiently fast A/D converter directly after reception and electronic processing, e.g., by filtering or amplifying the reflected signal. With radar measuring instruments, whose electromagnetic waves propagate at the speed of light, the measuring signal can be generated by means of additional steps. For this purpose, e.g., a pulse transit time method or a FMCW method (FMCW; frequency modulated continuous wave) is suitable. Both methods have in common that the short propagation time of the signal can be detected using additional steps. For example, in the FMCW method, the A/D converter can generate a so-called beat curve, i.e., an intermediate frequency signal that is generated after mixing a transmitted and correspondingly received chirp signal. The measurement signal, or echo curve, can then be obtained from the logarithmized result of a Fourier transform of the A/D converted beat curve.

Typically, especially the signal part reflected from surfaces of the medium, can be detected by the level-measuring device and recorded time-dependently to obtain the echo curve. This time dependence can be converted into a distance of a reflecting surface from the level-measuring device via the velocity of the signal and interpreted, for example, as an echo signal. Typically, such a measurement signal includes several local maxima, which are also referred to as echoes.

All evaluations and determinations performed by means of the level-measuring device can be performed on an entire digitally converted signal and/or an entire measurement signal, as well as on parts of the respective digitally converted signal and/or on parts of the measurement signal, in particular in order to be able to perform the evaluations and the determinations with minimal computing resources.

For example, the emitted signal of the level-measuring device can include a pulse shape, as in the case of a pulse radar level-measuring device, or include a signal with a linear frequency deviation, as in the case of the FMCW radar level-measuring device.

For example, if a strong signal is reflected due to a large surface area of the medium, the amplitude of the measurement signal will be correspondingly high after the propagation time of the signal. This high amplitude of a local maximum of the measurement signal reflected from a surface of the medium can be defined as a characteristic feature of the measurement signal for determining the level.

Typically, liquids with a high dielectric constant (DK value) reflect radar signals relatively strongly. A medium surface that does not reflect radar waves strongly would be, for example, a coarse-grained bulk material, and/or liquids with small DK values (dielectric constants), such as LPG (Liquified Petroleum Gas), oils and solvents.

Further local maxima, or echoes, can be caused, for example, by installations in the vessel, by buildup, etc., which are located, for example, between the product surface and the emitting unit.

A global maximum of the measuring signal can typically occur in a close vicinity of a radar level-measuring device due to disturbances caused e.g., by antenna coupling. Such interference, such as so-called “antenna ringing,” can be attributed to signal reflections from a horn antenna serving as the transmitting antenna of the radar level-measuring device or from a so-called “dome,” e.g., a duct in which the transmitter is located, and which in at least some cases is located at the top of an inner side of the vessel.

Because amplitude values measured in a close vicinity of the radar level-measuring device usually do not reflect any “useful information”, i.e., are not due to any reflection from a product surface, echoes from the close vicinity can be excluded from an evaluation, e.g., by a so-called “factory false signal suppression”, already at the manufacturer. For example, such a close vicinity can concern measurement distances of e.g., less than 10 cm or 20 cm from the transmitter, e.g., from a transmitter chip. This masking can be done, for example, by subtracting a predetermined measurement signal curve from a measured measurement signal prior to an evaluation of the measurement signal. The previously determined measurement signal curve, or reference echo curve, can essentially correspond to a measurement signal curve that was determined for an empty vessel, on a reference section or in the free field.

As the measurement signal progresses, the characteristic feature for a level determination can then be detected by a local maximum, and further local maxima can indicate other reflective surfaces, or interference, in a detection area of the level-measuring device by significant features of the measurement signal.

The disturbances can be attributed to many different causes.

A significant feature can be a local maximum in the measurement signal, which in particular can include an amplitude that is above a defined threshold value and/or a defined threshold value curve.

Since other objects can also reflect the emitted signal and appear as interferences, the measurement signal must be evaluated to identify the characteristic feature, and thus determine a distance of the medium from the level-measuring device.

The measurement signal can be visualized in a diagram whose x-axis represents a distance D, in linear representation, and whose y-axis represents an amplitude A of the measurement signal, characterized in dB.

The evaluation unit of the level-measuring device can be set up to monitor, in addition to the determination of the level, by means of a monitoring function, a quality of the determination of the level based on the characteristic feature, in order to determine whether a measurement task for determining the level is reliably solved.

In other words, by means of the monitoring function, a quality of the measurement signal or a quality of the characteristic feature and/or the evaluation of the characteristic feature can be examined cyclically to determine the filling level. The monitoring function or the evaluation unit can be set up to display an error and/or a warning if the measurement or determination of the filling level is determined to be uncertain.

For example, the monitoring function for a level-measuring device can evaluate an amplitude value from the measurement signal. For this purpose, the monitoring function can compare the amplitude value of the measurement signal with a minimum amplitude and monitor it continuously. If the amplitude value of the measurement signal of the product surface, i.e., the amplitude value of the characteristic feature for determining the level, falls below this amplitude value by a fixed amount and/or a parameterized amount, the monitoring function generates an error signal, such as a fault message, and provides this error signal at an output of the evaluation unit.

The level-measuring device and/or the evaluation unit can be set up so that the monitored amplitude value of the characteristic feature as well as the parameterized amount for monitoring can be selected according to an actual operating mode of the level-measuring device and/or adjusted, for example by parameterization.

In particular, for a start-up of the level-measuring device, the fixed or parameterized amount for examining the amplitude value of the characteristic feature can be selected higher than in the normal operating mode of the level-measuring device. This means that during start-up, the level-measuring device examines the determination of the characteristic feature for the determination of the level more sensitively and/or, if necessary, provides a corresponding error signal earlier than in the normal operating mode of the level-measuring device.

In other words, the evaluation unit is configured to react more sensitively by means of the monitoring function during start-up of the level-measuring device to any disturbances in the measurement signal or to disturbances in the characteristic feature itself that can affect the correct determination of the characteristic feature. Thus, it can be achieved that during start-up parameters for the determination of the characteristic feature of the measuring signal, or for the determination of the level, are optimized to achieve a safe operation at the operating mode.

Effects and/or disturbances that could impair a reliable determination of the level, such as an agitator in the detection range of the level-measuring device and/or waves on the surface of the medium and/or shaped surfaces of the medium that affect the amplitude of the measuring signal, and/or temperature effects can thus be detected more sensitively by the monitoring function in the start-up mode and announced in the form of a fault message. Advantageously, a modified parameter setting for the determination of the characteristic feature of the measurement signal, and/or the monitoring function can be made during the start-up, for example due to a fault message. Such a parameter setting can concern, for example, a modification of the strength of the emitted signal and/or an averaging of the measuring signal, so that the actual operation of the level-measuring device is not just safe, but also reliable.

This means that in operating mode, manual intervention, especially in parameterization, as in start-up, can be largely avoided. Thus, the level-measuring device can be used for safety-critical applications in an improved manner, in particular by means of the monitoring function, which selectively includes different sensitive quality levels for determining the level.

In other words, the level sensor is configured to perform, in addition to the classical evaluation of the measurement signal, additional monitoring functions that monitor whether the measurement task is solved safely. Due to the selectable different quality levels of the monitoring function, the level sensor is configured to react more sensitively to any disturbances during the start-up of the sensor, in order to make adjustments to the parameter settings for determining the level already during the start-up, if necessary. Thus, the level-measuring device is configured to examine cyclically the determination of the level, adapted to the start-up as well as to the operating mode, by monitoring the measuring signal itself and monitoring the evaluation of the same.

According to an aspect, it is proposed that the level-measuring device is based on a determination of a propagation time of the emitted signal; and in particular is a radar level-measuring device, or an ultrasonic level-measuring device, or a guided radar level-measuring device, or a guided microwave level-measuring device.

In this specification, the various aspects of the invention are often explained or elaborated in more detail using the example of a radar level-measuring device. However, the invention can be used in particular for all level-measuring devices in which the determination of the level is based on the propagation time of a signal.

A level-measuring device based on a determination of the propagation time (time of flight) of a signal can include a transmitter unit configured to transmit a signal in the direction of the medium and a sensor unit configured to receive reflected signals and to convert them digitally and to determine a distance to a medium from the propagation time of this signal in order to determine the level of the medium.

The level-measuring device can also be a pressure sensor level-measuring device that monitors the determination of the level by means of a monitoring function with different quality levels.

According to an aspect, it is proposed that the evaluation unit is configured to selectively determine the level of the medium in an operating mode or a start-up mode, wherein a quality level of the monitoring function in the operating mode differs from a quality level of the monitoring function in the start-up mode; and wherein the evaluation unit is configured in particular to be switched between the operating mode and the start-up mode by means of a switching signal provided to the level-measuring device.

During a start-up of the level-measuring device, a so-called reference measurement can typically be carried out. Here, for example, a tank is filled and emptied under process conditions and a determination of the correct level is monitored with the level-measuring device for correctness. Typically, five levels determined by the level-measuring device can be compared in this regard with real levels determined independently of the level-measuring device, e.g., manually. The values determined in this way, i.e., the independently determined values and the values determined by the level-measuring device, can, at the end of the start-up, be stored, e.g., for documentation, in particular by means of the level-measuring device.

The start-up can be considered successful if the levels determined by the level-measuring device match the independently determined levels. During this start-up, the monitoring function can monitor the determination of the level with a higher quality level more sensitive, for example to detect disturbances in the determination of the level. In this regard, it is advantageous that during the start-up, it is still possible to intervene, for example, via a separate parameterization, for the determination of the level with the level-measuring device, so that the actual operation, in the operating mode, of the level-measuring device, is not only safe, but also reliable. Thus, the start-up can be improved by using the level-measuring device described.

According to an aspect, it is proposed that the level-measuring device includes a memory for storing the levels determined by the level-measuring device, and in particular independently determined levels. Thereby, the level-measuring device is configured to log the independently determined levels and the levels determined by the level-measuring device.

Alternatively or additionally, the level-measuring device can be arranged to log the results of the monitoring function by having the respective monitoring function monitor the characteristic feature of the measurement signal to determine the level by means of at least a sub-function of the monitoring function. In particular, the results of the monitoring can be stored or logged by means of the respective sub-function.

According to an aspect, the level-measuring device is configured to determine the level selectively cyclically, i.e., at regular time intervals, or alternatively, i.e., event-controlled, such as triggered by a trigger signal. Such a trigger signal can be provided to the level-measuring device in each case when corresponding values for the level have been determined independently of a level.

The level-measuring device can be arranged, alternatively or additionally, to perform the determination and/or storage and/or logging of the levels determined by the level-measuring device only at certain predetermined levels.

According to an aspect, it is proposed that the level-measuring device is configured to determine, for an implementation of the monitoring function by means of a metric, a characteristic value with which the respective quality level can be quantified. An example of such a characteristic value can be an amplitude of a characteristic feature and/or a relevant feature. Another example can be a distance of the characteristic feature and/or the relevant feature from a threshold value curve. The characteristic value and/or the relevant metric can be provided for display to a user at an output of the level-measuring device and/or displayed at an, in particular graphical, interface, in particular of the level-measuring device.

According to an aspect, it is proposed that the level-measuring device is configured to determine a result of the monitoring function by determining an ideal key value based on a respective metric and comparing an actual key value with the ideal key value. The actual key value can be determined as a portion of the ideal key value and displayed, in particular as a percentage, on an interface, in particular a graphical interface, in particular of the level-measuring device.

If the monitoring function is formed with a plurality of partial monitoring functions, as further specified below, individual partial key values of the respective partial monitoring function can be determined and an overall key value can be determined by multiplying the partial key values together. This overall key value can also be determined proportionally from an ideal overall key value. This total key value can be displayed, in particular as a percentage, to a user at an interface, in particular a graphical interface, of the level-measuring device.

According to an aspect, it is proposed that the level-measuring device is configured to examine the determination of the level in the operating mode with a quality level depending on a type of start-up. That is, an operating quality level in the operating mode can include, depending on the type of start-up, a value between the higher quality level and the lower quality level or alternatively a different value for the operating quality level. Advantageously, this can represent the extent to which the function of the level-measuring device has been tested under the operating conditions, so that the level-measuring device in the operating mode, after complete and successful testing under operating conditions, is operated with a monitoring function in the operating mode whose quality level, for example, makes fewer requirements on the determination of the level than the lower quality level.

According to an aspect, it is proposed that the level-measuring device is selectively configured to disable the monitoring function when the sensor is not operating in a safe mode. The level-measuring device can then operate in a high accessibility operating mode.

According to an aspect, it is proposed that the level-measuring device includes an output module for outputting an error to provide an error signal if the quality level determined by the level-measuring device by means of the monitoring function and/or the key value determined by means of the metric is not sufficient for the selected quality level, in particular for a safe measurement. The level-measuring device can be arranged to indicate this actual key value on a display of the level-measuring device.

According to an aspect, it is proposed that the level-measuring device is configured to selectively activate or deactivate the monitoring function, in particular with a switch.

According to an aspect, it is proposed that the level-measuring device is configured to store a time history of respective actual key values in order to determine a degradation of the key value.

According to an aspect, it is proposed that the level-measuring device is configured to indicate a degree of degradation of a key value of a monitoring function and/or a partial monitoring function, wherein an actual key value is compared with a reference key value to indicate, depending on a comparison of the actual key value with the reference key value, at least a safe determination of the level or a still acceptable determination of the level at which a failure of the determination of the level is imminent, or a failure of the determination of the level.

In particular, the degree of degradation of the core value can be indicated to indicate and/or trigger a maintenance message during operation of the level-measuring device.

In particular, the degree of degradation of the key value can be indicated by means of a colored indicator, in particular corresponding to a traffic light.

For the determination of the degree of degradation, the range of comparison of the reference key value with the actual determined key value between 100%-70% can characterize the safe determination of the level and a range between 40 and 50% can characterize a still acceptable determination of the level.

Alternatively or additionally, the actual key value of the quality level of the monitoring function can also be compared with a target curve in order to define ranges, which are assigned to the colored display depending on a difference of the actual key value from the target curve. In particular, this colored display can indicate the quality of the determination of the fill level during a filling process, i.e., during a rapid change in the fill level.

According to an aspect, it is proposed that the level-measuring device is configured to indicate a time interval until failure of the safe determination and/or a level change until failure of the safe determination of the level, by comparing an actual key value of a monitoring function or a partial monitoring function, with a model-based determined key value of the monitoring function or the partial monitoring function. Such a model can be an empirical model of the change of the key value with temperature or an empirical model of the change of the key value with level.

Alternatively or additionally, the model for a radar level-measuring device can be based on a radar equation and/or on a distance A of the level from the level-measuring device to determine a prediction of a future amplitude of the characteristic feature, where the amplitude A of the reflected signal varies with distance r according to: A=1/r4.

For example, if a reflected signal with an amplitude of 100 dB is expected at 1 m distance of the level from the level-measuring device, it can be determined by means of the radar equation and/or by means of an assumption for a course of the amplitude A of the characteristic feature at a distance r during a filling by means of: A=1/r4, whether at a distance of 0.3 m the amplitude of the reflected signal is sufficient to safely stand out from the antenna ringing.

According to an aspect, it is proposed that the level-measuring device is configured to examine the respective level by means of the monitoring function with selected higher quality level for a start-up of the level-measuring device with start-up of defined levels, wherein the lower quality level of the monitoring function is activated in the operating mode of the level-measuring device in order to adjust parameters for determining the level for the operating mode, in particular during the start-up.

For such a start-up, the reference measurement, i.e., the start-up with approach of defined levels, can be started at the level-measuring device itself and/or started remotely, for example with a PC or a smartphone both wired and wirelessly coupled to the level-measuring device.

According to an aspect, it is proposed that the monitoring function includes at least one monitoring sub-function selectively including a higher quality level and a lower quality level, respectively, to realize the quality levels of the monitoring function based on the respective selected quality levels of the respective monitoring sub-function; and in particular, the evaluation unit is configured to generate an error signal when at least one of the monitoring sub-functions generates an error signal in monitoring the determination of the level corresponding to the selected quality level of the monitoring function to indicate an incorrect determination of the level.

In other words, the monitoring function itself can be composed of several individual sub-functions in order to advantageously monitor different properties of the measurement signal and/or the evaluation of the measurement signal, for determining the level.

Advantageously, the monitoring of the determination of the level can be adapted to different process and operating conditions of the level-measuring device by correspondingly adapted monitoring sub-functions.

According to an aspect, it is proposed that the evaluation unit is configured to realize the quality levels of the monitoring function based on a plurality of the monitoring sub-functions monitoring the determination of the characteristic feature of the level; and/or to generate the error signal depending on a plurality of the monitoring sub-functions detecting a deviation for a determination of the characteristic feature of the level to indicate an incorrect determination of the level.

That is, by an increased plurality of monitoring sub-functions for the higher quality level and a corresponding decreased plurality of monitoring sub-functions for the lower quality level, a higher quality level can be selected for the monitoring function regardless of the respective quality level of the monitoring sub-functions.

Advantageously, a higher plurality of monitoring sub-functions during start-up of the level-measuring device, in particular under process conditions with start-up of different levels, can monitor the determination of the level more sensitively in order to examine a minimum detection reliability for the level.

According to an aspect it is proposed that the level-measuring device is configured to examine the respective level by means of the monitoring function with a plurality of monitoring sub-functions for a start-up of the level-measuring device with start-up of defined levels, wherein the plurality of monitoring sub-functions for the start-up of the level-measuring device is larger than in the operating mode of the level-measuring device; and wherein in particular for the respective monitoring sub-function the higher quality level or the lower quality level is selected.

Advantageously, the higher quality level can also be achieved by having a plurality of sub-functions of the monitoring function examine the determination of the level. In this way, a higher requirement for the determination of the level during start-up can be adapted to the respective conditions and processes in which the level-measuring device is used.

According to an aspect, it is proposed that a first sub-function of the monitoring function for determining a detection reliability for the characteristic feature, monitors an amplitude of the characteristic feature caused by the level of the medium in the measurement signal; and in particular monitors a distance of the amplitude of the characteristic feature from a threshold value curve for a course of the measurement signal; and the higher quality level of the first sub-function monitors a higher amplitude; and/or monitors the characteristic feature with a higher running threshold value curve than the lower quality level of the first sub-function.

In other words, the level-measuring device, by means of the first sub-function of the monitoring function, is configured to evaluate a maximum amplitude of the characteristic feature of the measurement signal, the characteristic feature being due to a reflected signal from the product surface. In this regard, the first sub-function compares the maximum amplitude of the characteristic feature with a minimum amplitude to be continuously monitored corresponding to a selected product level.

If the maximum amplitude of the characteristic feature falls below the minimum amplitude, the first sub-function of the monitoring function can output a fault message or error message. In this regard, the level-measuring device is configured such that the minimum amplitude can be selected depending on an operating mode of the level-measuring device. During start-up of the level-measuring device, i.e., in a start-up mode, the minimum amplitude, corresponding to a threshold value, can be selected higher than during cyclic operation in operating mode. This means that during a start-up, the level-measuring device monitors the determination of the level more sensitively, and can therefore report an error more quickly than during operation.

According to an aspect, it is proposed that a second sub-function of the monitoring function for the characteristic feature evoked by the level of the medium predicts, based on a model-based worst-case scenario for a measurement signal of the next measurement, a next characteristic feature in the measurement signal to determine a prediction of the detection reliability, wherein the lower quality level of the second sub-function monitors an amplitude of the next characteristic feature evoked by the level of the medium and/or monitors a distance of the amplitude of the next characteristic feature from a threshold value curve; and in particular the higher quality level of the second sub-function monitors a higher amplitude; and/or monitors the next characteristic feature with a higher threshold value curve than the lower quality level of the second sub-function.

The level-measuring device can determine the level based on the measurement signal, wherein in particular the measurement signal for determining the characteristic feature of the measurement signal for the level is generated by means of a plurality of individual measurement signals by recursively averaging the plurality of individual measurement signals. The recursive averaging can be an "ensemble averaging". In this regard, a so-called "ensemble averaging" can be understood as an averaging of respectively corresponding values of a plurality of measurement signals of different measurements, and a "recursive ensemble averaging" can be understood as a partial averaging of respectively corresponding values of a respectively actual measurement signal with a previously averaged measurement signal, the previously averaged measurement signal resulting from an averaging of a plurality of respectively corresponding values of previous measurement signals.

It follows that an actual measurement signal is included in the, in particular predicted, measurement signal only in a weighted manner. For example, the actual measurement signal can have a weighting of e.g., 25% in the recursive averaging. The second sub-function of the monitoring function determines a model-based worst case for the next reflected signal of the next measurement in order to predict a measurement signal based on this. In other words, a statement can thus be made about the maximum extent to which a, in particular digitally converted, measurement signal can change based on the next measurement signal. In the case of small level changes or fluctuations in amplitude, the measurement signal predicted in this way will only change moderately. The second sub-function of the monitoring function, on the other hand, estimates the worst possible case for the course of the next measurement signal based on a model, corresponding to a diagnostic function.

An example of a model-based worst-case estimation can be that a subsequent reflected signal, in particular due to a moving surface of the medium, is reflected so unfavorably that no portions of the reflected signal originating from the level reach the level-measuring device. A characteristic feature in the predicted measurement signal would, with respect to the maximum amplitude, be reduced accordingly, but, because of the recursive averaging with weighting of successive measurement signals, would not disappear completely.

Thus, with the second partial function, a minimum detection reliability can be predicted, in particular with the first partial function, for the next determination of the level. The level-measuring device can be set up with the second partial function to report a fault or an error only if the measurement signal predicted in this way includes a characteristic feature which, when estimating the worst case for the next measurement signal of the next measurement, according to the first partial function, determines a detection reliability which is too low to generate a reliable and sufficiently accurate determination of the level.

Advantageously, it can be predicted with the second partial function, by means of a model build-up from an actual measuring signal, whether for the next determination of the level the measuring signal can have a correspondingly selected, sufficient quality for the determination of a safe measured value. If the quality, corresponding to a desired detection reliability, is not sufficient, the level-measuring device can be configured to indicate a fault.

According to an aspect, it is proposed that a third sub-function of the monitoring function for the characteristic feature caused by the level of the medium monitors a difference of an amplitude of at least one significant feature of the measurement signal from the characteristic feature, wherein the respective significant feature of the measurement signal is caused by a further reflection of the emitted signal; and the higher quality level of the third sub-function monitors a higher difference of the amplitude of the characteristic feature from the at least one significant feature of the measurement signal than the lower quality level of the third sub-function. The monitoring of significant features in the determination of the level by means of the level-measuring device can improve the safe and reliable determination of the characteristic feature and thus improve the determination of the level.

In this regard, a significant feature of the measurement signal can be an amplitude, in particular in a partial range, of the measurement signal, the maximum of which is above a certain threshold value and/or the maximum of which runs above a certain threshold value curve.

Advantageously, the third sub-function can be used to monitor an increase of significant features in order to be able to ensure a reliable determination of the characteristic feature.

According to an aspect, it is proposed that a fourth sub-function of the monitoring function monitors an occurrence of at least one significant feature in the measurement signal to identify the characteristic feature of the level; and the higher quality level of the fourth sub-function monitors a greater distance of the characteristic feature of the level from the at least one significant feature in the measurement signal and/or a higher difference of the amplitude of the characteristic feature of the level from an amplitude of the at least one significant feature in the measurement signal than the lower quality level of the fourth sub-function.

Alternatively or additionally, the fourth sub-function can monitor an occurrence of a significant feature in sub-regions of the measurement signal. In this regard, the significant feature can be based on a reflected signal component caused by adhesions to walls and/or contamination.

Alternatively or additionally, the fourth sub-function can be set up to monitor in different subranges of the measurement signal different differences of the amplitude of the characteristic feature to the significant feature occurring in this sub-range. This means that different required differences can be assigned to different subranges of the measurement signal in order to compare the amplitude of the characteristic feature with the amplitude of the significant feature.

A method for the start-up of a level-measuring device is proposed, wherein the level-measuring device includes an evaluation unit which monitors, by means of a monitoring function, the determination of the level based on a characteristic feature in a measurement signal and wherein the monitoring function selectively includes at least a higher quality level or a lower quality level to the determination of the level and includes the following steps:

- Activating the monitoring function for a determination of a fill level;
- selecting the higher quality level of the monitoring function;
- performing reference measurements of the level with the level-measuring device at different levels of a medium with the monitoring function in the higher quality level;
- comparing an association of a respective level with a respective output signal of the level-measuring device, for examining safe operation;
- selecting the lower quality level of the monitoring function to put the level-measuring device into operation.

With this method for start-up, on the one hand, the level-measuring device can be examined for the corresponding task and, by the higher quality level during start-up, it can be achieved that in the operating mode of the level-measuring device a safe and reliable determination of the level is possible even if the operating conditions in the operating mode are different from the operating conditions during start-up.

According to an aspect, it is proposed that the level-measuring device is configured to adjust parameters for determining the level; and the method for start-up includes the following step:

- Adjusting the parameters for determining the level in order to optimize the association of the respective level with the respective output signal of the level-measuring device. In this way, it can be achieved that, in operating mode, the level-measuring device can determine the level safely and reliably.

According to an aspect, it is proposed that the method for start-up of the level-measuring device is carried out with one of the level-measuring devices described above. With one of the level-measuring devices described above, the method for commissioning can be carried out in a particularly simple way, since the parameters can be adjusted after the reference measurement has been carried out with a higher quality level.

According to an aspect, a computer program is disclosed including instructions, which, when the computer program is executed by a computer, cause the computer program to execute one of the methods described above. In particular, the evaluation unit can include such a computer to execute the method and/or at least one step of the method.

Such a computer program can be part of an operating software for a start-up of the level-measuring device and/or for an operation of the level-measuring device. Alternatively or additionally, the computer program can be provided to be installed on a transportable operating device, such as a smartphone or cell phone or service module, in order to perform an operation and/or a start-up of the level-measuring device.

In this regard, the computer program can be arranged to compare a stored checksum based on stored parameters for operation of the level-measuring device with an actual calculated checksum based on actual parameters for operation of the level-measuring device. Alternatively or additionally, the computer program can be configured to automatically not start a commissioning wizard configured to perform any of the methods described above if the stored checksum is equal to the actual checksum.

A machine-readable storage medium is specified on which the computer program described above is stored. Thus, the method can be easily implemented on various control and monitoring devices.

A use of one of the level-measuring devices described above for sensing a level of a medium and/or for process control is proposed.

By using the level-measuring device cluster, a production process can be monitored with particular reliability.

It should also be noted that the various embodiments described above and/or below can be combined with each other.

BRIEF DESCRIPTION OF SEVERAL VIEWS OF THE DRAWINGS

Examples of embodiments of the invention are illustrated with reference to FIGS. 1 to 7 and are explained in more detail below. It shows.

DETAILED DESCRIPTION

Figure 1:
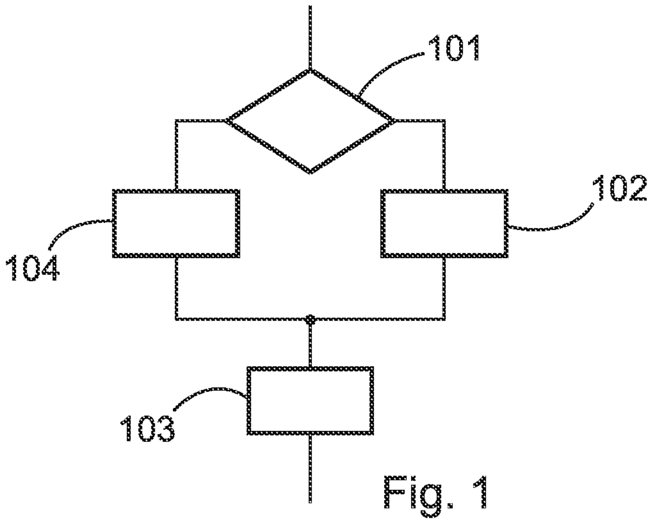
FIG. 1 a flowchart for selecting a quality level.

FIG. 1 sketches a flowchart for a first control of the level-measuring device with a discriminator 101 for selecting between an operating mode and a start-up mode of the level-measuring device. In this regard, the discriminator 101 can be switched between the different operating modes, for example, by means of a switching signal or by means of an electrical switch or a GUI switch or triggered by a keystroke on the level-measuring device control panel or on a level-measuring device control unit. In particular, the discriminator 101 can be arranged to select between the operating modes by selecting and providing a corresponding configuration value of a parameter set. Provided that the start-up mode has been selected, a parameter set for a monitoring function for a reference measurement, i.e., a measurement for the start-up of the level-measuring device of the respective monitoring function 103 is provided in step 102 in order to monitor the start-up with a monitoring function that monitors a higher quality level for a correct determination of the level than in the operating mode. Alternatively, the discriminator 101 can be used to select the operating mode so that a set of parameters for the monitoring function in the operating mode is provided in a step 104 of the monitoring function 103 to examine a lower quality level for a correct determination of the level in the operating mode.

Figure 2:
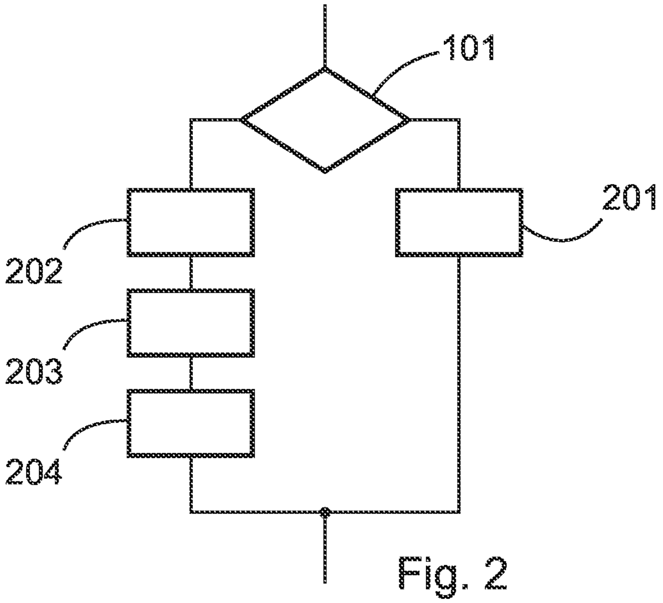
FIG. 2 a flow chart for selecting monitoring sub-functions.

FIG. 2 sketches a flowchart of an alternative second control of the level-measuring device with the discriminator 101. If the operating mode has been selected by means of the discriminator 101, a monitoring function for the determination of the level is selected to examine in the operating mode a lower quality level for the correct determination of the level. Alternatively, the start-up mode can be selected with the discriminator 101, which then activates the partial monitoring functions 202, 203 and 204 to examine the correct determination of the fill level with a higher quality level in the start-up mode. In this regard, a higher quality level or a lower quality level can selectively be selected for the respective partial monitoring functions 202, 203 and 204 themselves. I.e., in other words, in the start-up mode, the monitoring function of the start-up can be composed of several sub-functions in order to monitor more analyses and/or contributions for the determination of the level in this mode than in the running mode in the operating mode.

Figure 3:
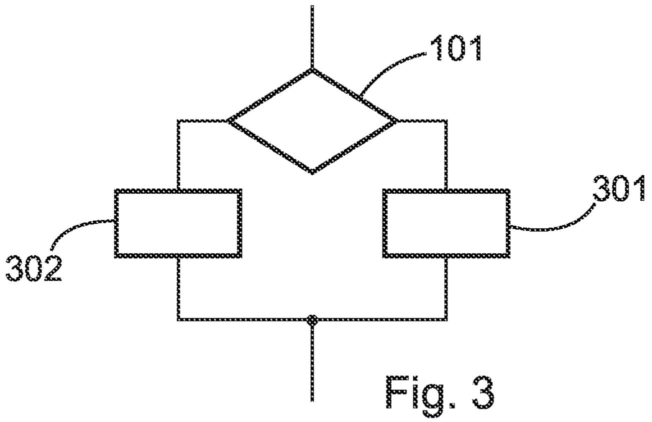
FIG. 3 a flow chart for selecting operating modes.

FIG. 3 sketches a flowchart of an alternative third control of the level-measuring device using the discriminator 101. Provided the operating mode has been selected by means of the discriminator 101, a monitoring function 301 for the operating mode is activated or selected. When the start-up mode is selected by the discriminator 101, a monitoring function 302 is selected or activated for the start-up mode to examine the determination of the level at a higher quality level during start-up than in the operating mode.

Figure 4:
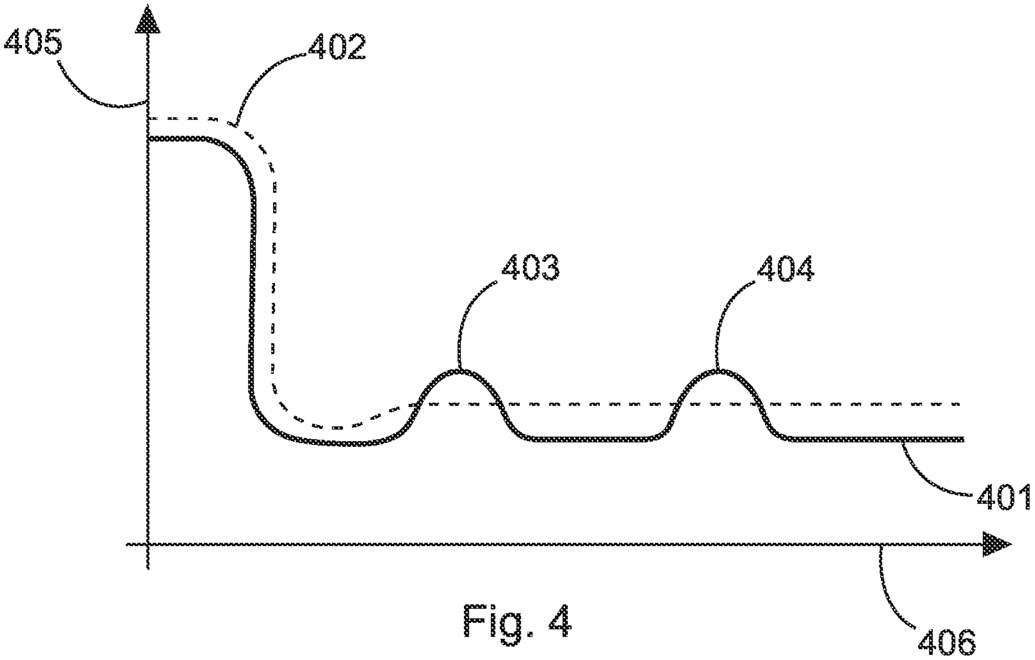
FIG. 4 a measurement signal of a level-measuring device with characteristic feature and significant feature.

FIG. 4 sketches a time course of a measurement signal 401, or an echo curve 401, of a level-measuring device, wherein the measurement signal 401 is based on a reflected signal transmitted from the level-measuring device towards the medium and received again. The abscissa 406 is a time axis of the measurement signal, which is proportional to a distance from the level-measuring device, which can be measured in meters, and the ordinate 405 indicates an amplitude of the measurement signal, for example in dB.

In addition, a threshold value curve 402 is shown dashed in the diagram of FIG. 4. In the course of the measurement signal 401, a characteristic feature 403 of the measurement signal and a significant feature 404 are each sketched in the form of a local maximum. Based on the temporal position of the characteristic feature 403, the level can be determined. The significant feature 404 can be defined such that the amplitude of the measurement signal locally at this location is above the threshold value curve 402. The significant feature 404 can be based on an interfering reflected signal component caused by a disturbance, such as an installation within a vessel or a multiple reflected signal between the level and the vessel ceiling. In this regard, the characteristic feature 403 also extends above the threshold value curve 402. A distance of a maximum amplitude of the characteristic feature 403 from the threshold value curve 402 can be defined in proportion to a detection reliability of the characteristic feature 402. A detection reliability metric can be expressed as a distance from the threshold value curve 402 in dB or percent. A dB value, determined from the distance of the maximum amplitude from the threshold value curve, can be expressed as a percentage using reference values. Thus, it can be determined by system theory or empirically that a detection reliability of, for example, 120 dB corresponds to a percentage value of 100%, whereas 0 dB consequently corresponds to a percentage value of 0%. The reference value 120 dB can correspond to a maximum possible detection reliability of the signal processing of the level-measuring device.

This detection reliability can be monitored by a first part monitoring function by comparing a distance of the maximum amplitude of the characteristic feature 403 from the threshold value curve 402 to a predefined value for a minimum distance. When the distance falls below the minimum distance, the first partial monitoring function can output an alarm signal and/or trigger an alarm.

Figure 5:
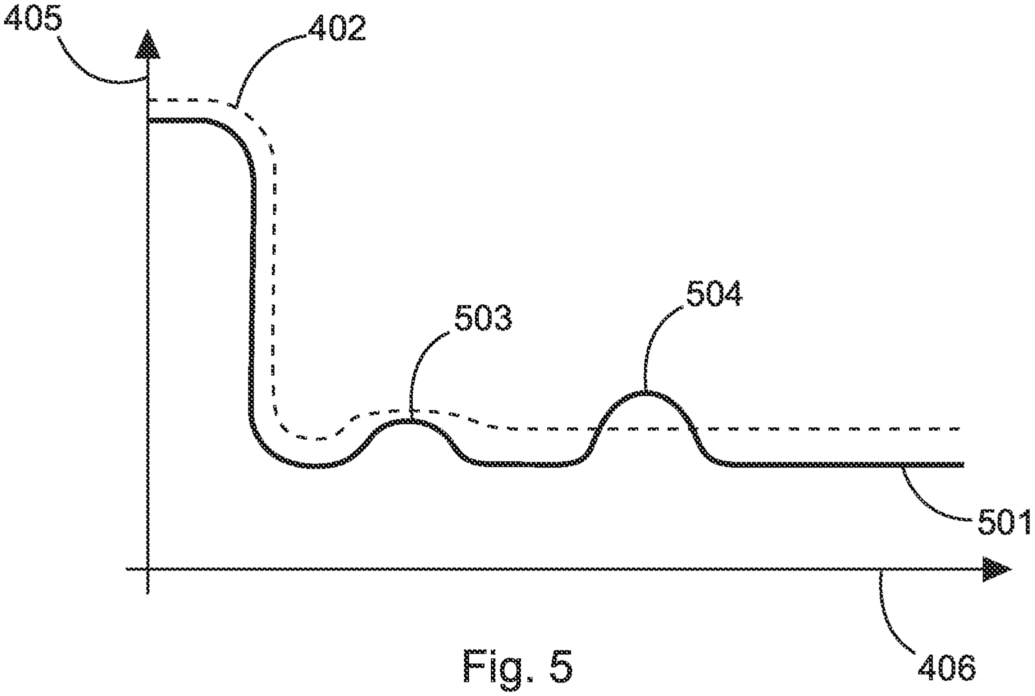
FIG. 5 a measurement signal of a level-measuring device with a worst case estimation of a characteristic feature.

The diagram of FIG. 5 corresponds to the diagram of FIG. 4 and, when viewed together with FIG. 4, illustrates a second partial monitoring function for the characteristic feature caused by the level of the medium, based on a model-based worst-case scenario for the next measurement signal of the next measurement. In this regard, a next characteristic feature 503 in the measurement signal is predicted to determine a detection reliability prediction. The second sub-function determines an amplitude of the next characteristic feature 503 caused by the level of the medium. The measurement signal 401, based on a reflected signal emitted from the level-measuring device toward the medium, can include recursive averaging, as discussed in more detail above. In this regard, the recursive averaging of the measurement signal 401 can be performed such that a following measurement is only included in the averaging with a weighting of, for example, 25%. With a first model-based assumption, which for example assumes that the (transmitted) signal is reflected onto a surface of the medium away from the level-measuring device, it can be determined to what extent the characteristic feature 503, can change maximally. I.e., it could be that the measuring signal of the subsequent measurement, or determination, of the level, due to a moving surface, of the medium to be determined with respect to the level, is reflected so unfavorably that no signal components of the (emitting) signal, emanating from the level, reach the level-measuring device, i.e., a sensor of the level-measuring device.

With a second model-based assumption, which assumes small level change or fluctuation in level, the characteristic feature 503 will change only moderately. When the second part monitoring function estimates the worst case, the first model-based assumption is made. The amplitude for the characteristic feature 503 estimated in this way can be compared to the threshold value curve 402 to thus determine the minimum detection reliability for the next measurement as a prediction. The diagnostic function for the predicted detection reliability qualified by this described metric can report a failure if the detection reliability for the worst-case estimate is a value predefined for the predicted detection reliability too low to determine a level with sufficient confidence and accuracy.

A requirement for the predicted detection reliability by means of the second partial monitoring function can in this regard be monitored with a selected higher quality level with a corresponding higher predefined value for the predicted detection reliability or alternatively a lower quality level with a lower predefined value for the predicted detection reliability can be monitored. By means of the higher quality level, for example, the determination of the characteristic feature can be monitored in a start-up mode. By means of the lower quality level, for example, the determination of the characteristic feature can be monitored in an operating mode of the level-measuring device.

Although the amplitude of the characteristic feature 503, according to FIG. 5, decreases in comparison with the characteristic feature 403 of FIG. 4, the characteristic feature 503 can still be detected, because, due to the recursive averaging over all successive converted measurement signals, the influence of a single worst-case estimate for the amplitude of the characteristic feature only enters according to the weighting, such as 25%. The resulting reduction of the amplitude of the characteristic feature 503 can be estimated by means of the amplitude of the characteristic feature 403 and is outlined in FIG. 5 with the characteristic feature 503. The significant feature 404 of FIG. 4 is not affected by the model-based assumptions and is thus transferred to the significant feature 504 of FIG. 5.

If, according to the prediction, it is determined that the predicted detection reliability falls below the threshold value curve 402, a fault message can be generated, for example, to signal a result of the monitoring of the determination of the level by means of the second sub-function.

In the example of FIG. 5, the predicted characteristic feature 503 has been estimated and sketched by means of a maximum possible reduction of the amplitude of the characteristic feature 401 from FIG. 4. In this worst-case scenario, the characteristic feature for the level 403 is transformed into the characteristic feature 503, whereas the significant feature of a disturbance 404 is transformed into the significant feature 504. The second partial monitoring function can detect, in accordance with the first partial monitoring function, that a next predicted characteristic feature 503 could include too low detection reliability in the next determination of the fill level and additionally generate a fault message by means of a third partial function described above, since the significant feature of the disturbance can still be present and the difference of the amplitudes of the characteristic feature under significant feature is too small.

Figure 6:
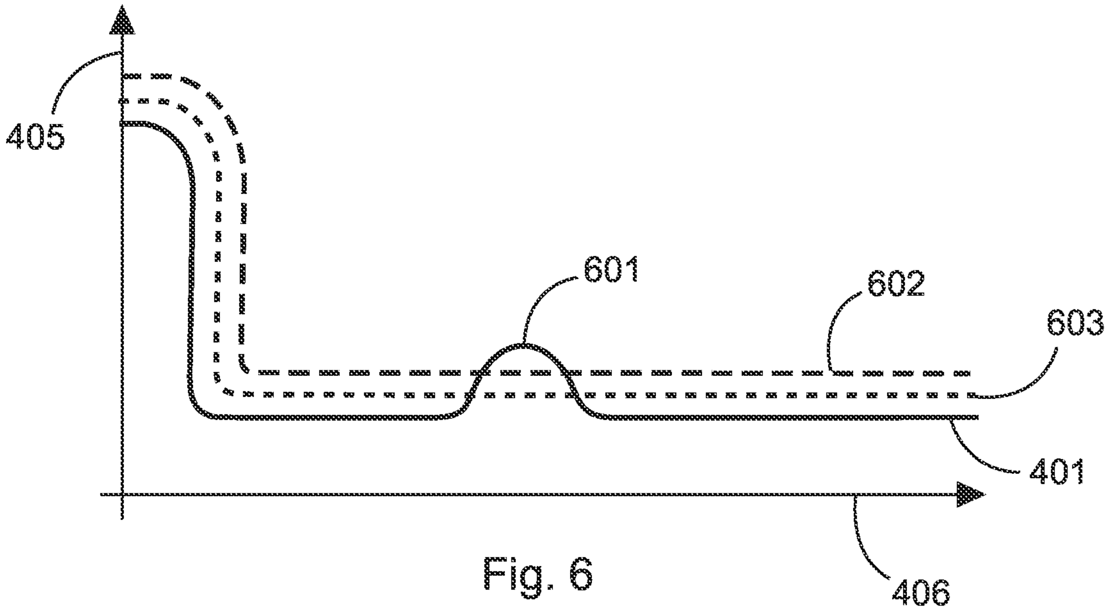
FIG. 6 a measurement signal of a level-measuring device with a threshold value curve.

The diagram of FIG. 6 corresponds to the diagram of FIG. 4 and sketches a function of the first partial function of the monitoring function with an example.

The measurement signal 401 includes a characteristic feature 601 whose maximum amplitude is at a different distance from the first threshold value curve 602 or the second threshold value curve 603. In this regard, the first threshold value curve 602 for the higher quality level of the first partial function of the monitoring function can include a higher course with respect to the amplitude of the characteristic signal 601 or the ordinate 405 than the second threshold value curve 603.

By comparing the characteristic feature 601 with the first threshold value curve 602 for monitoring the characteristic feature, by means of the first sub-function of the monitoring function, a higher quality level can be examined for a start-up mode of the level-measuring device than by comparing the characteristic feature 601 with the second threshold value curve 603 for an operating mode. The first part monitoring function, which requires a minimum value of detection reliability, examines the determination of the characteristic feature in the start-up mode more sensitively than in the operating mode. Thus, the detection reliability that can be determined with a metric that measures the distance of the maximum of the characteristic feature 601 from the higher sloping first threshold value curve 602 will generally be below the determined detection reliability during start-up in the start-up mode during ongoing operation of the sensor in the operating mode.

Switching to the start-up mode of the first part monitoring function can be done using a parameter data set, with the first part monitoring function configured to monitor at the higher quality level. Effects, which could affect a safe determination of the level, are thus rather determined in the start-up mode by the first part monitoring function and can be reported in the form of a fault message.

Figure 7:
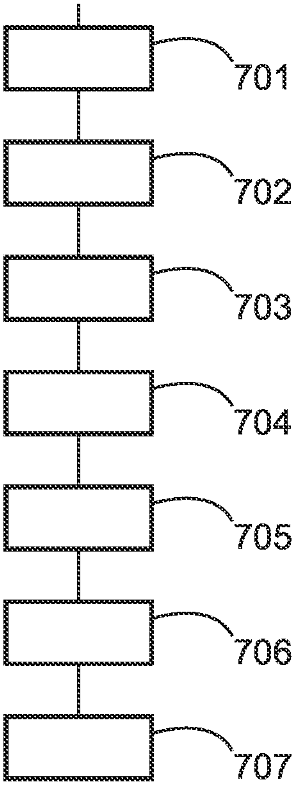
FIG. 7 a flow diagram for safe start-up of a level sensor.

FIG. 7 sketches a flow diagram for a method for the, in particular safe, start-up of a level sensor.

In a first step 701, optionally as part of the start-up, the level sensor is installed or mounted at the measuring point, e.g., a tank, for determining the level of a medium and, if necessary, electrically connected if it is not already mounted.

In a second step 702, the monitoring function for determining the level in the start-up mode, i.e., with selected higher quality level, is activated and/or parameters and/or configuration values of the monitoring function for the start-up mode of the monitoring function of the evaluation unit of the level-measuring device are provided. Examples of such parameters and/or configuration values can be, for example, a transmission strength of the signal and/or a strength of the averaging of the measurement signal and/or a threshold value curve and/or a higher threshold value curve and/or parameters of the evaluation algorithms and/or metrics, as well as their parameters for the monitoring function and/or evaluation parameters for the detection of the characteristic feature of the measurement signal.

Furthermore, a measuring point can be designated here as an optional step, or adjustments can be made.

In the third step 703, the level-measuring device is operated in start-up mode with the corresponding higher quality level. I.e., in other words, in addition to the actual determination of the level, the level-measuring device examines cyclically and in start-up mode with a higher quality level by means of the monitoring function a quality of the measurement signal and/or the characteristic feature for determining the level with a higher quality level.

In the fourth step 704, the reference measurements for the start-up are performed, whereby, for example, five different levels of the medium, for example in a vessel, are actually set, or approached, and the level-measuring device determines the corresponding levels in order, if necessary, to modify parameter values of the level-measuring device for determining the level in the event of fault messages based on the results of the monitoring function with a higher quality level, so that a level of the medium can be reliably determined in the operating mode, i.e., with a lower quality level. In this regard, it can be provided that with a graphical user interface, such as a display, or at an interface, both the selected quality level of the monitoring function and the monitored error are provided. By comparing an association of a respective level to a respective output signal of the level-measuring device, a safe operation of the level-measuring device operating mode can be examined. If necessary, this fourth step 704 can be repeated to reconfigure the determination of the level with new parameter values, such as a modified transmission strength or adjusted signal processing, in order to successfully complete the start-up in the fifth step 705 when the start-up is performed again.

In the sixth step 706, as an optional step of the method, a change of the parameters of the level-measuring device for determining the level can be secured against changes. Especially for safety-critical applications of the level-measuring device, it is recommended to protect the level-measuring device against parameter changes by protecting the level-measuring device against unauthorized access, e.g., by means of a password or a PIN, in order to protect the parameterization against changes.

In the seventh step 707, the operating mode of the level-measuring device for ongoing operation is selected, in which the monitoring function is operated with a lower quality level. I.e., the monitoring function is still active for safety, but it operates less sensitively than during start-up. Manual intervention as during start-up should therefore be excluded.

The invention claimed is:

1. A level-measuring device for determining a level of a medium, comprising:

processing circuitry configured to generate a measuring signal for determining the level based on a digitally converted signal of a reflected signal emitted from the level-measuring device toward the medium, determine the level of the medium based on a characteristic feature of the measuring signal, and monitor, by way of a monitoring function that is separate from the determination of the level, a correctness or plausibility of the determined level based on the characteristic feature, wherein the monitoring function is selectively operable at a first quality level or a second quality level, and the quality of monitoring is higher at the first quality level than at the second quality level, wherein the processing circuitry is further configured to selectively determine the level of the medium in an operating mode or a start-up mode, the start-up mode corresponding to a commissioning phase of the level-measuring device, and wherein, in the start-up mode, the processing circuitry is configured to perform reference measurements of the level at different filling levels of the medium and to operate the monitoring function at the first, higher quality level to verify an accuracy and safe operation of the determined level, and wherein, in the operating mode, the monitoring function operates at the second, lower quality level.

2. The level-measuring device according to claim 1, wherein the level of the medium is determined based on a determination of a propagation time of the emitted signal.

3. The level-measuring device according to claim 2, wherein the level-measuring device is one of: a radar level-measuring device, an ultrasonic level-measuring device or a guided radar level-measuring device.

4. The level-measuring device according to claim 1, wherein the processing circuitry is further configured to, during start-up of the level-measuring device and as the level approaches one or more predetermined reference levels, operate the monitoring function at a higher quality level to verify accuracy of the determined level, and wherein, during an operating mode, the monitoring function operates at a lower quality level.

5. The level-measuring device according to claim 4, wherein, in the operating mode, the monitoring function is operated at the lower quality level, and the processing circuitry is configured to adjust parameters for determining the level, including signal thresholds or calibration values, in response to monitoring results obtained during a start-up mode.

6. The level-measuring device according to claim 1, wherein the monitoring function includes a plurality of monitoring sub-functions, each of which is selectively operatable at a higher quality level or a lower quality level, and wherein the processing circuitry is further configured to generate an error signal if at least one of the monitoring sub-functions, when operating at the selected quality level, detects an error in the determination of the level.

7. The level-measuring device according to claim 6, wherein processing circuitry is further configured to determine the quality level of the monitoring function based on a plurality of monitoring sub-functions, each monitoring the determination of the characteristic feature of the level; and/or generate the error signal to indicate an incorrect determination of the level depending on a number of the monitoring sub-functions that detect a deviation in the determination of the characteristic feature of the level.

8. The level-measuring device according to claim 6, wherein a first sub-function of the monitoring function is configured to determine a detection reliability for the characteristic feature by monitoring an amplitude of the characteristic feature caused by the level of the medium in the measuring signal generated by the processing circuitry, and wherein, at the higher quality level, the first sub-function monitors whether the amplitude of the characteristic feature exceeds a higher threshold value or applies a more stringent threshold function than at the lower quality level.

9. The level-measuring device according to claim 8, wherein the first sub-function of the monitoring function monitors a distance of the amplitude of the characteristic feature from a threshold value curve for a course of the measurement signal.

10. The level-measuring device according to claim 6, wherein a second sub-function of the monitoring function is configured to, based on a model that predicts a worst-case scenario for the measurement signal, predict a characteristic feature in a subsequent measurement signal in order to determine a prediction of detection reliability, and wherein the second sub-function is operable at a lower quality level, at which monitoring an amplitude of the predicted characteristic feature in the subsequent measurement signal is performed and/or monitoring a distance of the amplitude of the predicted characteristic feature from a threshold value or threshold curve is performed.

11. The level-measuring device according to claim 10, wherein the second sub-function of the monitoring function, when operating at the higher quality level, monitors the amplitude of a predicted characteristic feature in a subsequent measure signal using a higher threshold value or more stringent threshold function than when operating at the lower quality level.

12. The level-measuring device according to claim 6, wherein a third sub-function of the monitoring function is configured to monitor a difference between an amplitude of at least one significant feature in the measuring signal and the amplitude of the characteristic feature, wherein the significant feature in the measuring signal is caused by a further reflection of the emitted signal, and wherein the third sub-function is operable at a higher quality level, at which it monitors for a greater difference between the amplitude of the characteristic feature and at least one significant feature in the measuring signal than at a lower quality level of the third sub-function.

13. The level-measuring device according to claim 6, wherein a fourth sub-function of the monitoring function is configured to monitor an occurrence of at least one significant feature in the measuring signal to assist in identifying the characteristic feature of the level, and wherein the fourth sub-function is operable at a higher quality level, at which monitoring for a greater distance in time, amplitude or signal value between the characteristic feature and at least one significant feature in the measuring signal occurs, and/or for a greater difference in amplitude between the characteristic feature and the at least one significant feature, than at the lower quality level of the fourth sub-function.

14. The level-measuring device according to claim 1, wherein the processing circuitry is further configured to, during start-up of the level-measuring device and as the level approaches one or more predetermined reference levels, operate the monitoring function using a plurality of monitoring sub-functions, and wherein a number of monitoring sub-functions used during start-up is greater than the number of monitoring sub-functions used during an operating mode.

15. The level-measuring device according to claim 14, wherein for each respective monitoring sub-function the higher quality level or the lower quality level is selectable.

16. A level-measuring device for determining a level of a medium, comprising:

processing circuitry configured to generate a measuring signal for determining the level based on a digitally converted signal of a reflected signal emitted from the level-measuring device toward the medium, wherein the level is determined based on a characteristic feature of the measuring signal and monitor, by way of a monitoring function, the determination of the level based on the characteristic feature, wherein the monitoring function selectively operable at a first quality level or a second quality level, and the quality of monitoring is higher at the first quality level than at the second quality level, wherein the monitoring function includes a plurality of monitoring sub-functions, each of which is selectively operatable at a higher quality level or a lower quality level, and wherein the processing circuitry is further configured to generate an error signal if at least one of the monitoring sub-functions, when operating at the selected quality level, detects an error in the determination of the level.

17. The level-measuring device according to claim 16, wherein the processing circuitry is further configured to selectively determine the level of the medium in an operating mode or a start-up mode, and wherein the monitoring function operates at a first quality level during the start-up mode and at a second quality level during the operating mode, the first quality level being higher than the second quality level.

* * * * *